Oct. 13, 1953   P. CHALFIN ET AL   2,655,242
COIN-CONTROLLED CARD DISPLAYING AND VENDING MACHINE
Filed Feb. 7, 1948   10 Sheets-Sheet 4

INVENTORS
PHILIP CHALFIN &
BENJAMIN CHALFIN
BY Joshua R. N. Potts
THEIR ATTORNEY Oct. 13, 1953 P. CHALFIN ET AL 2,655,242
COIN-CONTROLLED CARD DISPLAYING AND VENDING MACHINE
Filed Feb. 7, 1948 10 Sheets-Sheet 6
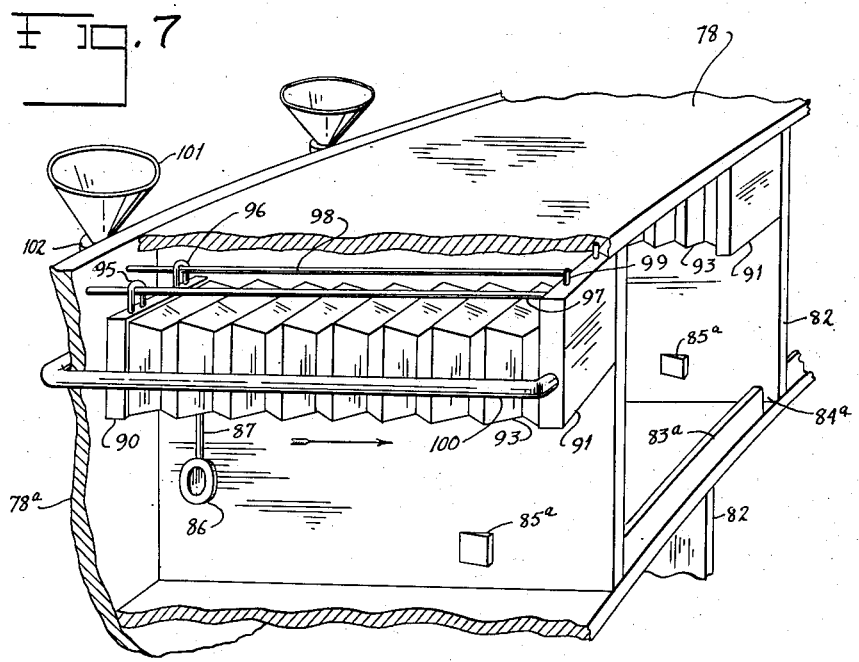
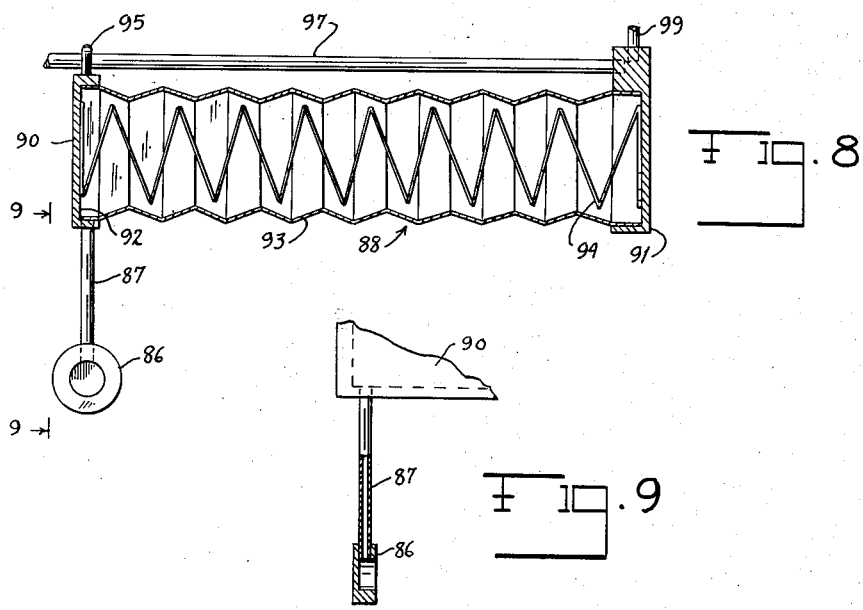
INVENTORS
PHILIP CHALFIN &
BENJAMIN CHALFIN
BY
THEIR ATTORNEY Oct. 13, 1953   P. CHALFIN ET AL   2,655,242
COIN-CONTROLLED CARD DISPLAYING AND VENDING MACHINE
Filed Feb. 7, 1948   10 Sheets-Sheet 7
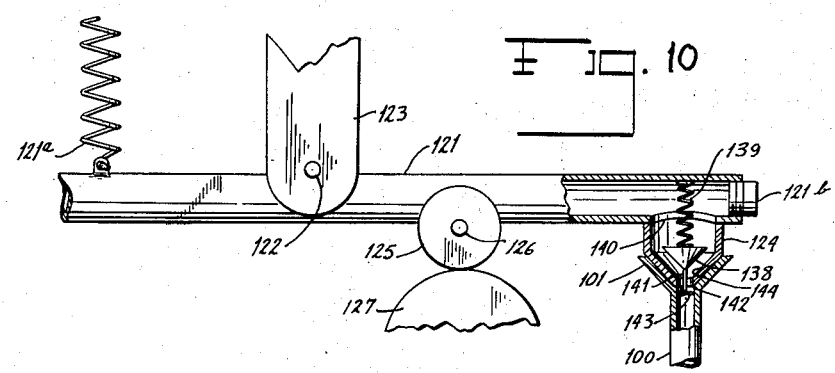
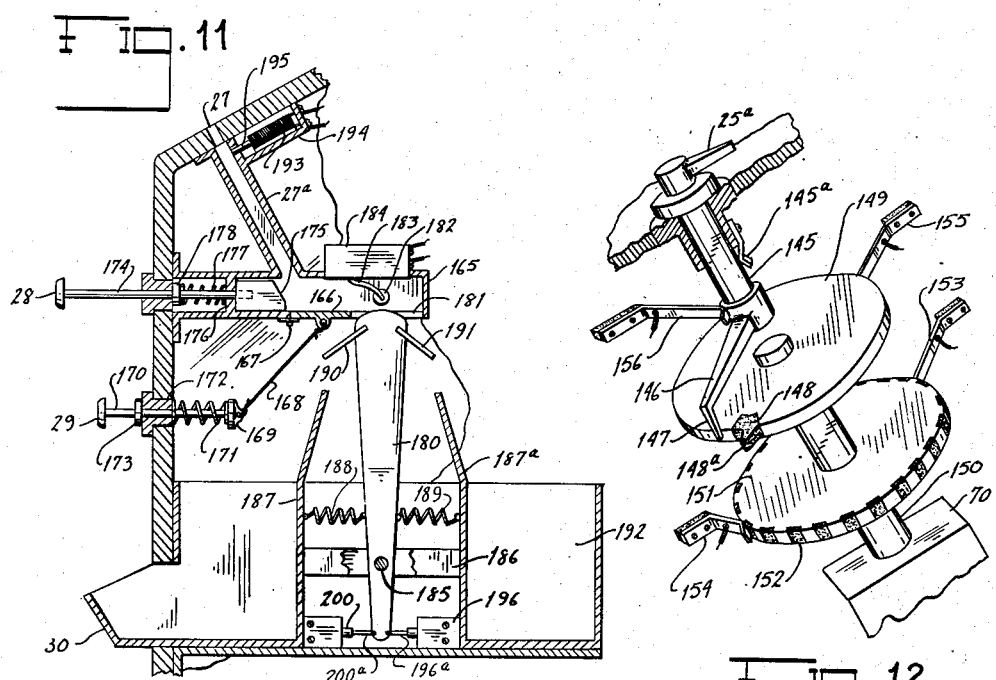
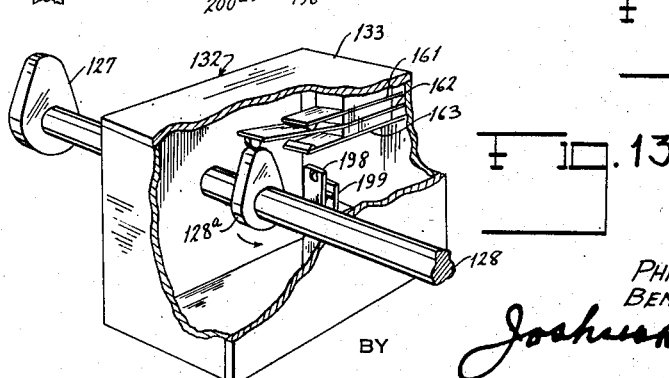
INVENTORS
PHILIP CHALFIN &
BENJAMIN CHALFIN
BY Joshua R. H. Potts
THEIR ATTORNEY

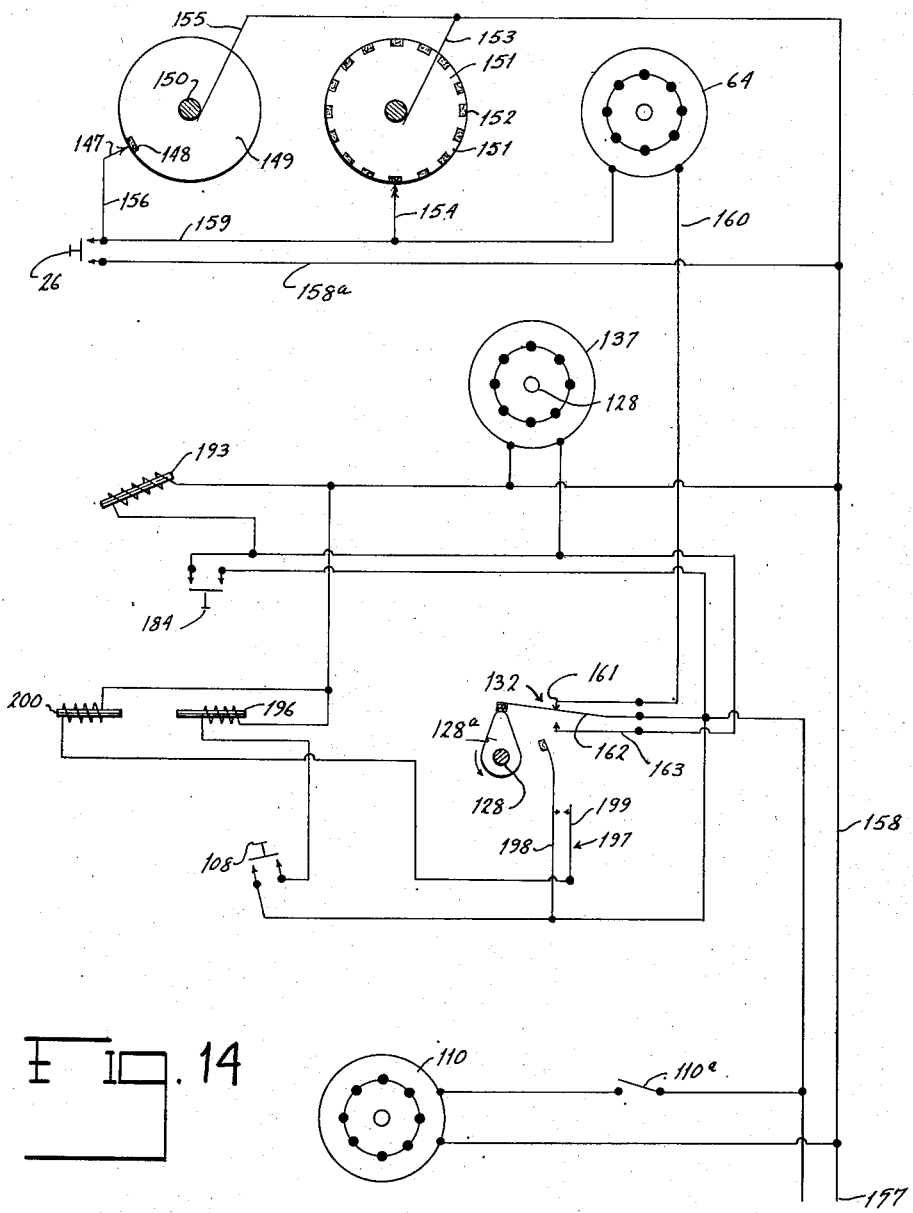

Oct. 13, 1953 P. CHALFIN ET AL 2,655,242
COIN-CONTROLLED CARD DISPLAYING AND VENDING MACHINE
Filed Feb. 7, 1948 10 Sheets-Sheet 9
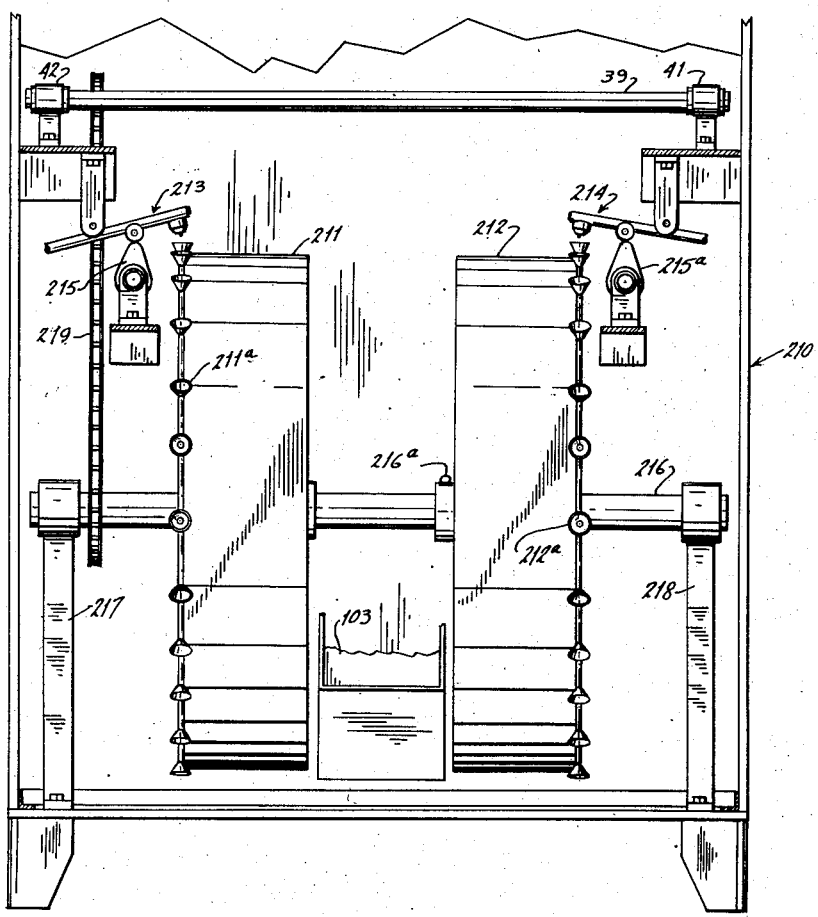
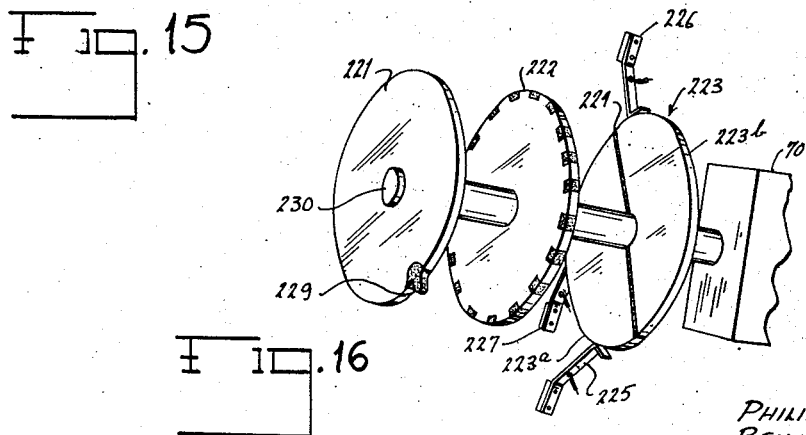
INVENTORS
PHILIP CHALFIN &
BENJAMIN CHALFIN
BY
THEIR ATTORNEY Oct. 13, 1953 P. CHALFIN ET AL 2,655,242
COIN-CONTROLLED CARD DISPLAYING AND VENDING MACHINE
Filed Feb. 7, 1948 10 Sheets-Sheet 10

INVENTORS
PHILIP CHALFIN &
BENJAMIN CHALFIN
BY Joshua R. H. Potts
THEIR ATTORNEY Patented Oct. 13, 1953

2,655,242

UNITED STATES PATENT OFFICE 2,655,242

COIN-CONTROLLED CARD DISPLAYING AND VENDING MACHINE

Philip Chalfin, Eatontown, N. J., and Benjamin Chalfin, Philadelphia, Pa.

Application February 7, 1948, Serial No. 6,984

10 Claims. (Cl. 194—10)

1

This invention relates in general to vending machines and, more particularly to a novel, coin-controlled display and vending machine for the display and sale of greeting cards, picture postals, booklets and the like.

The principal object of the invention is to provide a fully automatic, coin-controlled card-display and vending machine embodying certain desired improvements and conveniences; adapted for use in railroad stations, mercantile establishments, public booths, and other places of public assembly; and having an unusually large and diversified supply of cards or other items with means facilitating their quick inspection and dispensing.

Another object is the provision of a coin controlled, card-display and vending machine incorporating improved loading and dispensing facilities with substantially automatic control, both of the display and vending mechanisms.

Another object is the provision of a display and vending mechanism having improved coin-controlled mechanism and electrically operated facilities, and wherein the prospective purchaser may be free to select a different card other than the one originally selected up to the time the initially deposited coin reaches the coin hopper.

A further object is the provision of improved electric circuit-making and breaking instrumentalities for the actuation of the various operating components of the device.

A still further object is to provide a device that will afford the public a larger and more diversified selection of cards and in a more convenient disposition for inspection, than in previous devices of this type.

Other objects and advantages of the novel design and construction employed, and of the operating facilities afforded will appear more fully hereinafter, and will be best understood when taken in connection with the accompanying drawings, wherein.

2

Figure 1:
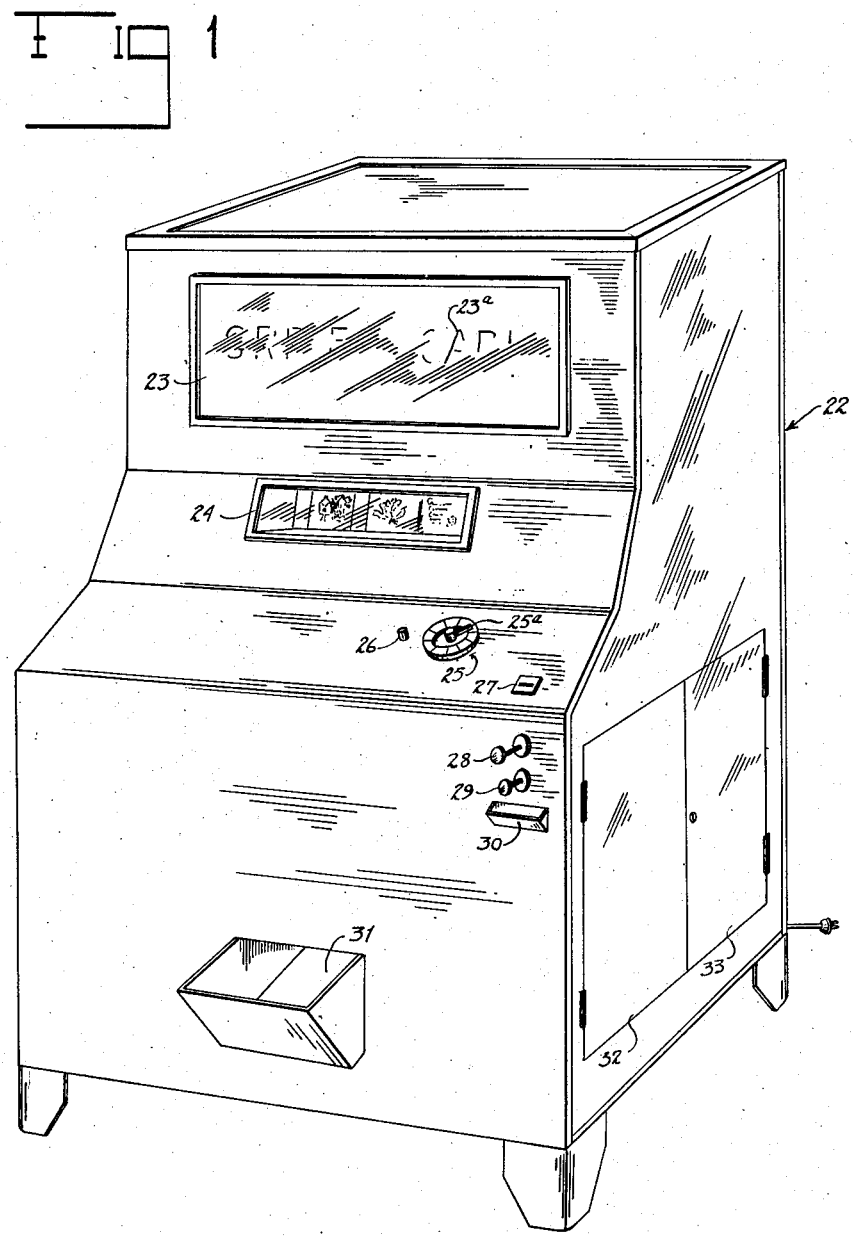
Figure 1 is a perspective view of the exterior of a coin-controlled display and vending machine embodying the invention.
Figure 4:
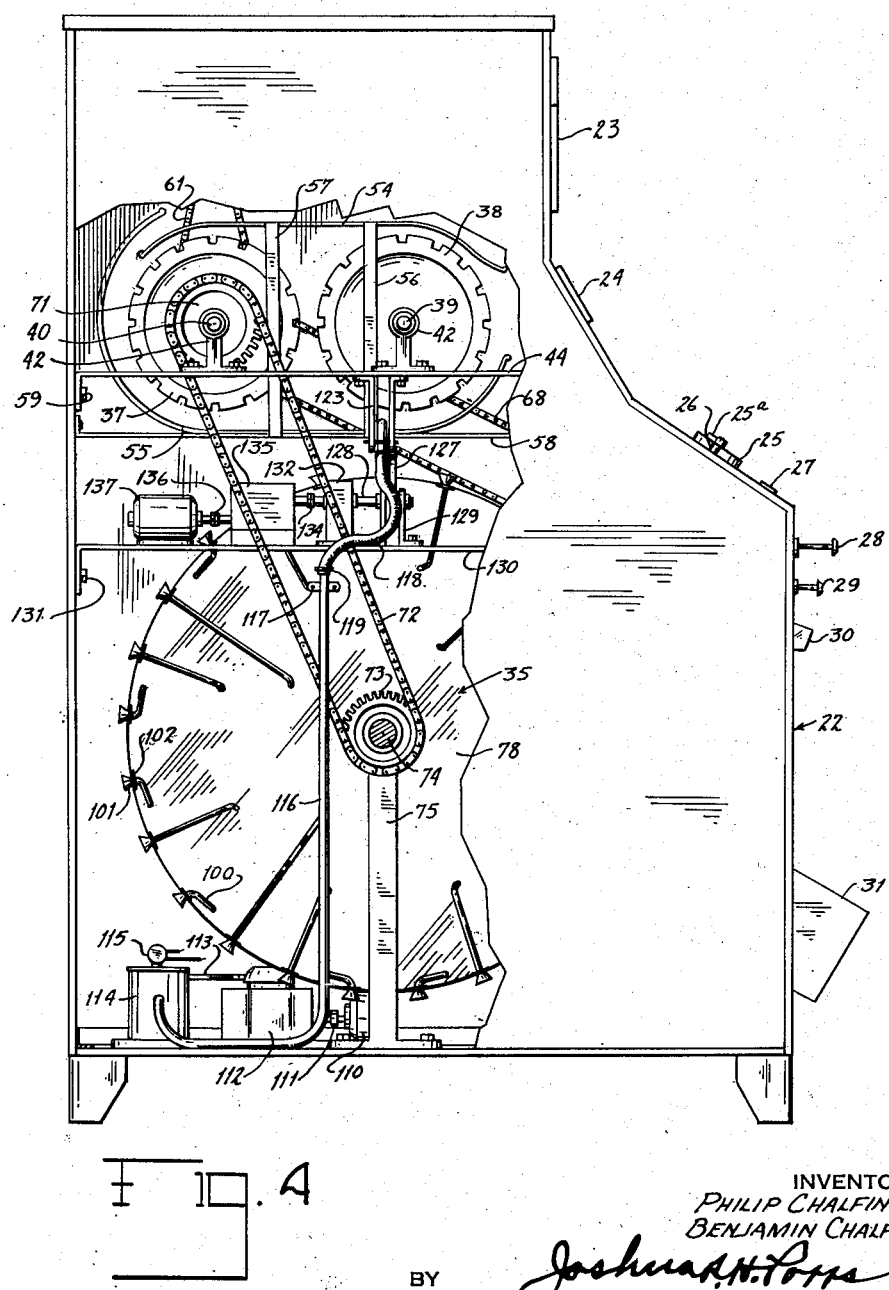
Figure 5:
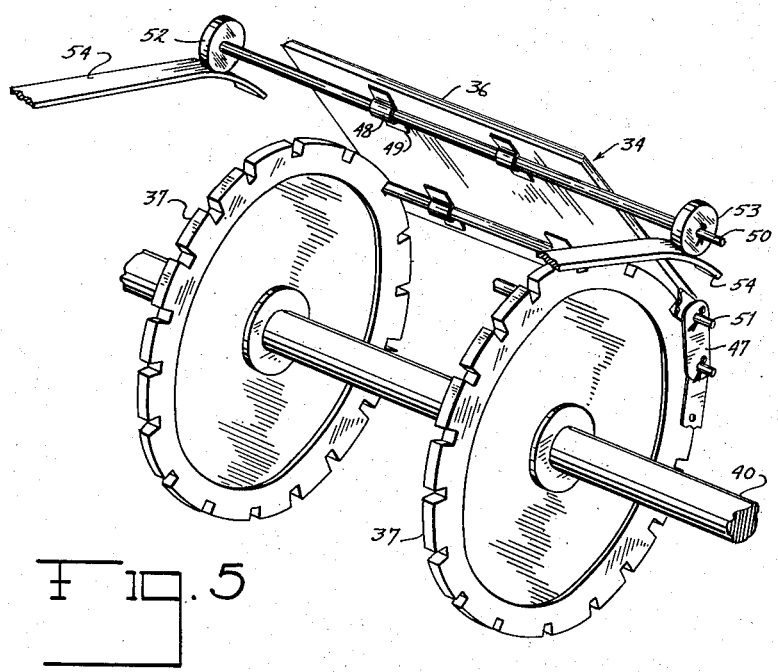
Figure 6:
Figure 17:
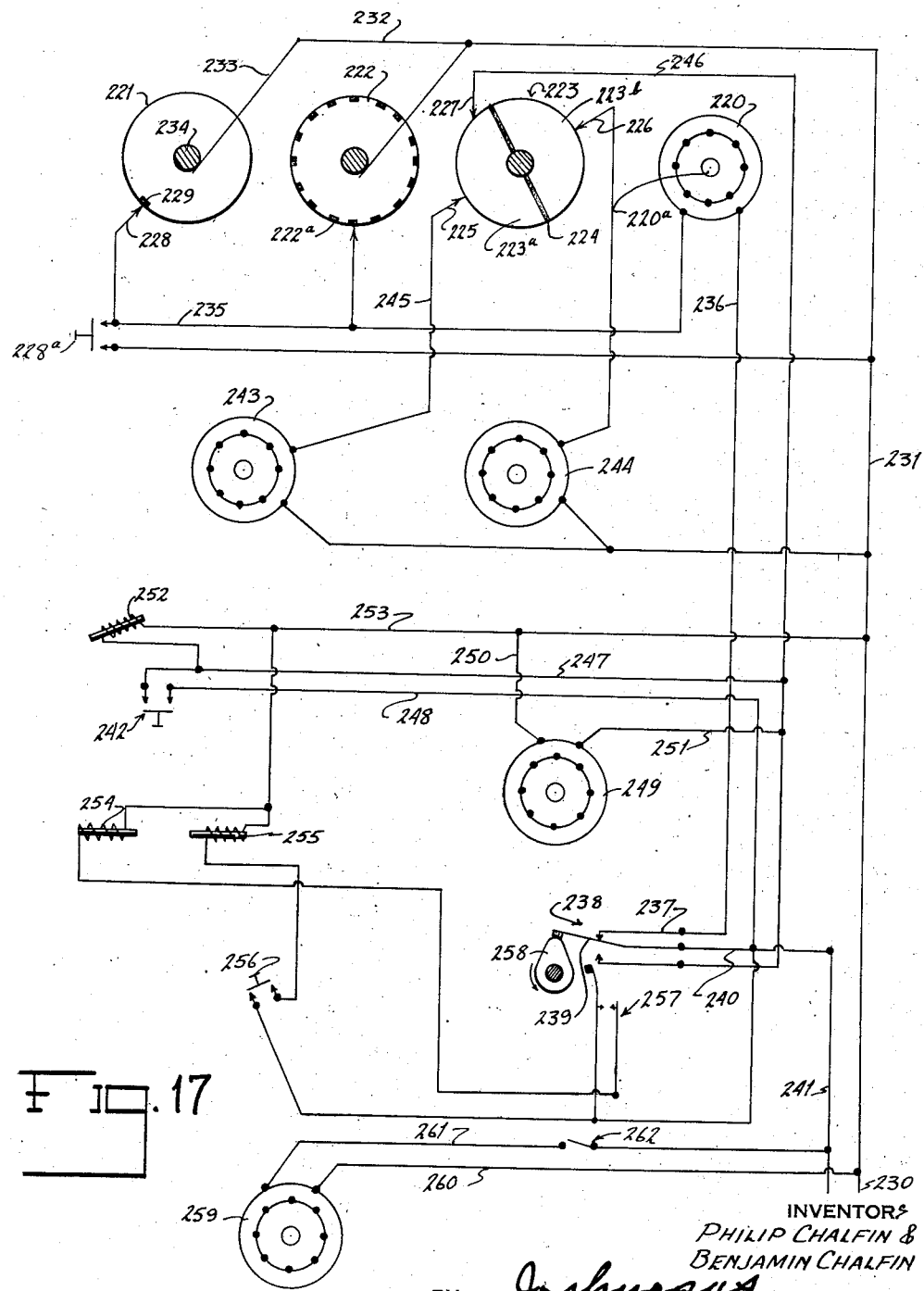

Fig. 4 is an elevational view of the device, with parts broken away for clarity of illustration, as seen from the left hand side of Fig. 1;

Fig. 5 is an enlarged, perspective view, with parts broken away, and showing in detail, a portion of the card-display assembly;

Fig. 6 is a front elevational view of the card-display means and showing a card as seen in the normal position for making a selection;

Fig. 7 is an enlarged, fragmentary perspective view, with parts broken away, and showing a portion of the vacuum-controlled, card-delivery means;

Fig. 8 is an enlarged, fragmentary elevational view, partly in section, and showing a portion of the bellows assembly or means which operate by vacuum to convey a card to the delivery chute of the device;

Fig. 9 is a fragmentary elevational view, partly in section, as seen on line 9—9 of Fig. 8, looking in the direction of the arrows;

Fig. 10 is an enlarged, fragmentary elevational view, partly in section, with parts broken away and disclosing details of the means for applying or controlling the reduced air pressure or vacuum which functions to lift and convey a card to the delivery chute;

Fig. 11 is a fragmentary elevational view, partly in section, with parts broken away, and showing certain operating controls and associated parts which co-act to either return a coin to the customer, or to deposit it in the coin container of the machine;

Fig. 12 is an enlarged, fragmentary perspective view of the means employed for energizing and de-energizing the electrical circuit which function to selectively operate the card-display assembly and card-supply drum;

Fig. 13 is an enlarged perspective view, with parts broken away, of the power-driven cam means which function to operate a switch to prevent actuation of the card-display and card-supply instrumentalities during the delivery cycle and also to maintain the cam-operating motor circuit closed until the card is delivered;

Fig. 14 is a diagrammatic representation of the electrical circuit and certain associated parts;

Fig. 15 is a fragmentary, front elevational view, with parts broken away, of a modified form of the card-supply mechanism;

Fig. 16 is a view similar to Fig. 12 and showing a slightly modified form of the circuit-energizing and deenergizing means; and Fig. 17 is a view similar to Fig. 14 and showing diagrammatically the electrical circuit employed in the modified form of the invention.

The invention contemplates the provision of an improved dispensing machine for the display and sale of greeting cards, although, the mechanism is adaptable for the sale of articles such as booklets, phonograph records, and various other items. The device is particularly adapted for use in large mercantile marts and such places as railroad stations, department stores, and wherever a prospective purchaser desires to select a card from a large and diversified assortment in the most convenient way and with a substantial saving of time. It permits the customer to change his mind as to the selection of a card prior to the actual delivery of the card. For example, in railroad stations, where a purchaser may have but a few minutes available to select a card from a group, the machine by its novel mechanism will quickly bring to view an entire preselected group of cards, such as birthday cards, and then, upon actuation of a button, each card of that group will be individually brought into view.

Referring now in detail to the drawing wherein similar characters of reference indicate corresponding parts in the view of the preferred forms of the invention, the numeral 22 designates generally a cabinet or casing which houses the operating components of the device.

As viewed exteriorly, the front side of the cabinet 22 is provided with an illuminated or fluorescent panel, as at 23, which may bear a suitable advertising slogan, as at 23a. Beneath the glass panel 23, a viewing window 24, which permits an inspection of the cards or other merchandise, is secured. The operating controls of the machine are also conveniently arranged on the front of the cabinet, as best shown in Fig. 1, and these include the card group selector dial 25, dial pointer arm 25a; the individual card selector button 26; the coin receiving slot 27; the coin advancing plunger button 28; coin return knob 29 and associated coin return receptacle 30; and the card delivery bin 31. A pair of hinged and normally locked doors 32, 33 on the side of the cabinet affords access to the interior thereof, when desired.

Within the cabinet 22, the rotary card-display assembly, indicated generally at 34, and the card-delivery assembly, indicated generally at 35, together with their electrically operated driving components, are operatively housed. The card-display assembly 34 comprises a plurality of trays 36 each of which is detachably and movably secured to conveying means which include two pairs of spaced sprockets 37, 38 fastened respectively to shafts 39, 40, rotatably supported in pairs of bearing brackets 41, 42 respectively, supported on spaced platforms 43, 44, and secured thereto, as by the screw bolts 45. The platforms 43 and 44 are secured to adjacent portions of the cabinet. The pairs of sprockets 37, 38 are operatively connected by a pair of link chains 46, 47, arranged in spaced parallelism.

Each tray 36 has secured to its undersurface pairs of spaced resilent clips, as at 48, which may be fastened at one end, as at 49, to the adjacent surface of the tray while having their opposite end free.

The resilient clips 48 are turnably and removably secured to bars 50, 51 and permit the trays 36 to be detached when desired, and others substituted therefor. Each of the bars 50 has secured to its opposite ends, rollers 52, 53 which engage upper and lower pairs of guide straps or tracks 54, 55, respectively, that are arranged at opposite sides of the rotary card display assembly 34 and which are maintained in the position best shown in Fig. 3, by vertically disposed, attached bars 56, 57. The bars 56, 57 in turn are fastened at their lower ends to horizontally extending supporting straps 58, bolted or otherwise suitably secured to the front and back of the cabinet 22, as at 59.

The means for driving the card-display mechanism 34 referred to above, includes a sprocket 60 fastened to the shaft 40 and operably connected as by the chain 61 to a gear reduction unit indicated generally at 62 in turn connected as by the coupling 63 to a motor 64 supported on a bracket 65 fastened to an adjacent side of cabinet 22. A second sprocket 66 on the shaft 40 is operably connected to a sprocket 67, by a chain 68, the sprocket 67 being secured to the operating shaft 69 of a gear reduction unit, indicated generally at 70 and connected to means associated with the card group selector 25, as hereinafter described more fully.

Figure 2:
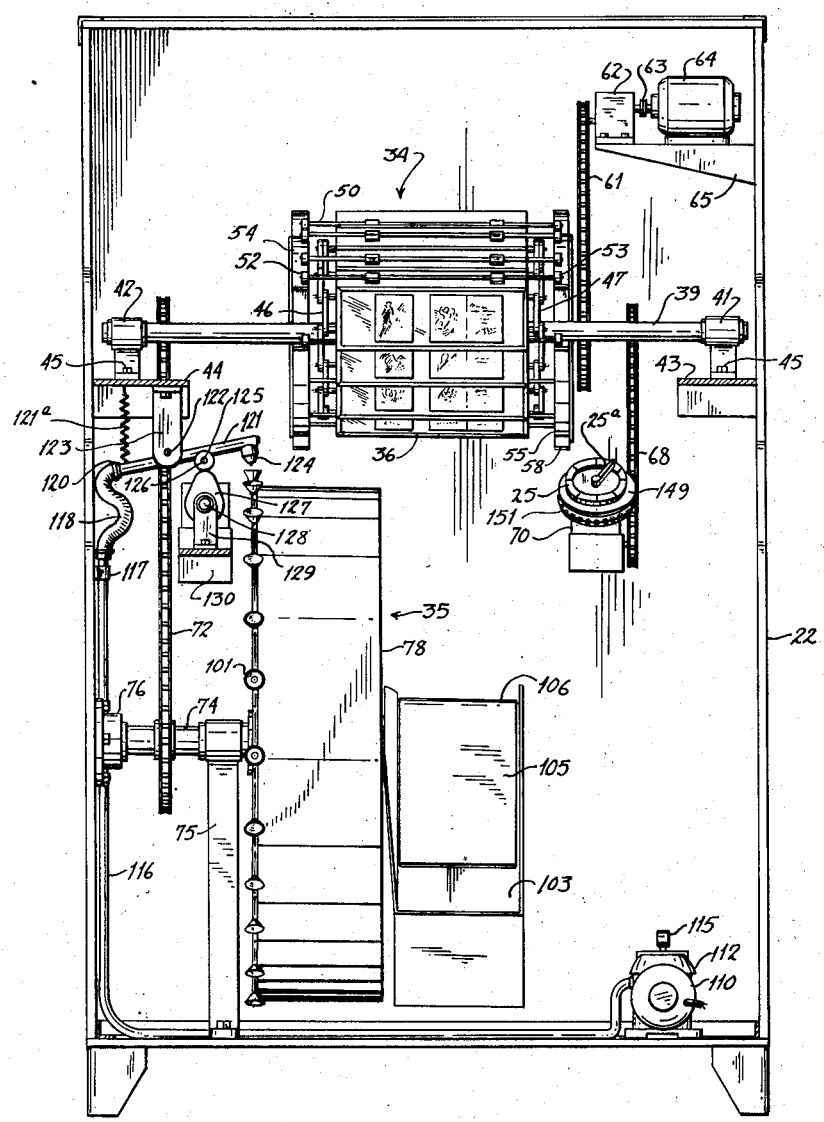
Fig. 2 is a front elevational view of the device with portions of the cabinet removed for clarity of illustration, and showing a number of the operation components, including the rotary card-display assembly and the card supply drum.
Figure 3:
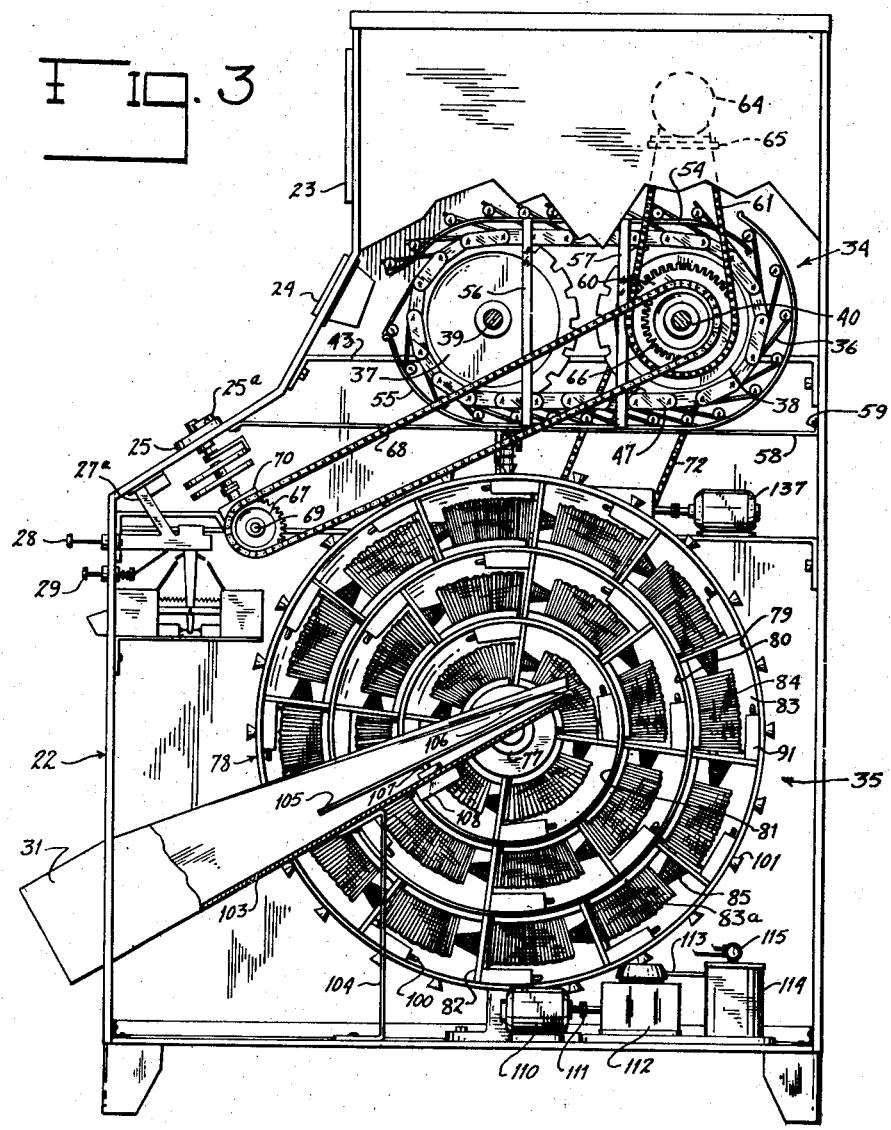
Fig. 3 is an elevational view of the apparatus, with portions of the cabinet removed, as seen from the right hand side of Fig. 1, and showing additional details of the card-display mechanism and the associated drum supply, together with certain other components.

As best shown in Figs. 2, 3 and 4, the shaft 40 bears an additional sprocket 71 which is connected by a chain 72 to a sprocket 73 fastened to a shaft 74 rotatably mounted in a bearing bracket or standard 75, and at its other end in a bearing bracket 76 arranged on a side of the cabinet.

The shaft 74 has secured thereto the hub 77 of a drum 78 which forms a component part of the card-delivery assembly 35. As best shown in Fig. 3, the drum 78 includes a plurality of concentric rings 79, 80, 81 which are maintained in spaced relation by radially positioned ribs or struts indicated generally at 82. The ribs 82, in combination with the hub 77 and concentric rings 79, 80, 81 provide a plurality of concentric rows or tiers of bins or compartments 83, each bin accommodating an ample supply or group of greeting cards, as at 84; each card preferably being included in an envelope of proper size. A coil spring 85 in each bin 83 and confined between the outermost card of each group and the surface of an adjacent radial rib 82, serves to maintain each group of cards in compact form and having the innermost card juxtaposed against a vacuum cup or card-gripper element 86.

As best shown in Figs. 7, 8 and 9, each card-gripper 86 is operatively connected by a pipe 87 to a bellows assembly, indicated generally at 88 and including a pair of plates, 90, 91 recessed on one side as at 92, to accommodate the opposite ends of a flexible and collapsible tubular member 93. The collapsible bellows member 93 is normally maintained in the extended position shown in Figs. 7 and 8 by a coil spring 94 confined therein and between the plates 90, 91. The inner plate 90 has a pair of U-shaped members 95, 96 fastened to its top edge and receiving a corresponding pair of guide bars 97, 98 secured in turn to the outer wall 78a of the drum 78 and to the fixed plate 91, the latter being fastened to a portion of an adjacent ring of the drum, as by the studs 99. As hereinafter described, as the air begins to be evacuated from the collapsible member 93, and through a pipe 100 having the conical socket 101, secured as at 102, to the outer circumference of the drum 78, the said collapsible member will convey its attached movable plate 90 and the card gripper or vacuum cup 86 thereon outwardly from the drum 78 in order to deposit an attached card into a delivery chute 103 supported by a bracket 104 on the floor of the cabinet 22 and in the inclined position shown in Fig. 3.

The delivery chute 103 includes a shelf 105 pivoted therein, as at 106, and partially supported by a plunger button 107 of a circuit-making and breaking switch 108. As hereinafter described, the impact of a card falling on the shelf 105 from any of the card bins 83 will angle the said shelf in a counterclockwise direction and thereby thrust downwardly the plunger 107 of the switch 108 to complete temporarily a holding circuit effective for actuating means to direct a coin, previously deposited in the coin slot 27, into the cash box or hopper 102, as will be described more fully hereinafter.

The suction or vacuum-applying means and the instrumentalities associated therewith for conveying a preselected card from the drum of the card-supply assembly 35, includes a motor 110 mounted on the floor of the cabinet 22 and having its shaft coupled, as at 111 to a suction pump designated generally at 112, which is connected as by the pipe 113 to a vacuum tank 114 having a suitable pressure-indicating gauge 115. The vacuum tank 114 has connected thereto a pipe 116 which, as best shown in Fig. 4, is extended from the vacuum tank and upwardly to a supporting bracket 117 on one side of the cabinet. The circuit of the motor 110 includes an automatic pressure-controlled switch, of conventional design and indicated generally at 110a. Whenever the suction or air pressure in vacuum tank 114 exceeds a predetermined value, the switch 110a will close and complete the circuit to create the desired degree of suction, after which it will automatically open to break the circuit. To the upper end of the pipe 116, one end of a flexible hose 118 is connected, as by the pipe clamp 119. The other end of the hose 118 is coupled, as at 120, to a pipe 121 pivotally or rockingly mounted, as by the pin 122, on a hanger or bracket 123 suitably secured or bolted to the shelf or platform 44. The suction pipe 121, which has its outer end closed, as by the plug 121b, is resiliently biased by a tension spring 121a, connected at one end to the said pipe and at its other end to the shelf 44, and is provided with a valve-equipped, conical nozzle member 124, hereinafter described more fully, that is adapted to coact with any of a plurality of conical sockets 101 on the card supply drum 78.

The means for rocking the pipe 121 with a view to temporarily connecting the nozzle 124 to any one of the sockets 101 or disconnecting it from a socket to which it may have been previously attached, includes a cam roller 125 rotatably mounted on a pin 126 secured to the undersurface of the pipe 121. The cam roller 125 is operatively engaged by a cam 127, fastened to a shaft 128, turnably supported on a bracket 129 in turn secured to a shelf or platform 130 secured to the front and back of the casing or cabinet 22 in any suitable manner as by the screw bolts 131. The cam shaft 128 is connected to a circuit-making and breaking switch assembly, designated generally at 132, having a housing 133 and hereinafter described more fully; the said shaft 128 also being extended and coupled, as at 134, to a gear reduction or exchange assembly designated generally at 135, that is coupled in turn, as at 136, to a motor 137. The motor 137 not only serves to actuate the suction-applying means, but also, as hereinafter described more fully, the switching means which function to control the card delivery cycle and the coin collecting and return mechanism.

As best shown in Fig. 10, the nozzle member, designated generally at 124 and referred to above, includes a valve having a conical body member 138 engaged by a compression spring 139 confined between the top of the valve body and the adjacent inner surface of the rockingly mounted pipe 121 into which it is protruded through an opening 140. By further inspection of Fig. 10, it will be seen that the valve body or member 138 has a depending stem 141 secured to its apex and normally protruding exteriorly of the opening 142 in the outer end of the nozzle. The lower end of the stem 141 is adapted to engage a pin 143 transversely arranged in each of the pipes 100 and adjacent their conical sockets 101. In the position depicted in Fig. 10, the stem of the valve 141 has engaged in the pin 143 and as a consequence, the valve body 138 has been raised from its conical seat 144 in the nozzle member 124. In this last-mentioned position, reduced air pressure or suction from the tank 114 and via the pipe 116, hose 118, and rocking pipe 121 is being applied through the immediate socket 101 actually engaged by the nozzle member 124 in order to actuate the collapsible member 93 to convey the gripper socket 86 and a card now engaged therewith to a position where, as previously mentioned, it may fall into the chute 103 at a time when the vacuum is relieved as the cam 127 raises the nozzle 124 out of the conical socket 101 previously engaged, and by means described hereinafter.

In order to bring a desired group of cards within the scope of the viewing window 24, as for example birthday cards, the dial pointer 25a with its attached stem 145 having the attached radially-extending arm 146, will be turned by the prospective purchaser. The arm 146 is equipped with a depending contact prong or finger 147 engaging an insulated segment 148 arranged in the circumference of a metallic disc 149, secured to an upper end of a shaft or rod 150 operatively connected and forming a part of the gear reduction unit 70 hereinbefore mentioned. The insulated segment 148 has a projecting stop 148a for a purpose hereinafter explained. The shaft 150 also has secured thereto a second metallic disc 151 provided with a series of spaced circumferentially-positioned insulating segments 152. The last-mentioned disc 151 and its shaft 150, as best shown in Fig. 12, are engaged by two circuit-completing strips 153, 154 respectively, which as hereinafter described more fully, are adapted to convey current through the shaft 150 and disc 151 respectively, at a predetermined time. The first-mentioned disc 149, as also shown in Fig. 12, is engaged by a contact strip or arm 155, while the hub of the arm 146 is correspondingly engaged by a contact strip 156. The energizing electric circuit of the device or more particularly those portions thereof associated with and made operable by parts connected to the dial 25 and push button 26, is shown in Fig. 14.

It will be understood that the motor 64, through the interconnected series of gears and chains described above and illustrated in Figs. 2, 3 and 4, will simultaneously actuate or rotate the card-display assembly 34, the card supply or delivery assembly 35 and the gear reduction unit 70 until a position of the drum is reached that is effective to permit the dispensing of the card desired. This partial rotation of the shaft 150 and the discs 149 and 151 attached thereto, which will equal in value the arc described by the finger 25a when originally set to the sector of the dial 25 enclosing the notation indicating the cards desired, will bring the insulating segment 148 again under the finger 147, thereby breaking the circuit and deenergizing the motor 64, as the stop or prong 148a engages and prevents disengagement of the finger 147 from the said insulating segment.

In order to prevent angular movement of the arm 146 as the disc 149 turns and prior to contact of the insulated stop prong 148a with finger 147 of arm 146, a friction shoe 145a is secured to an adjacent extension of the cabinet. The said shoe normally functions as a brake to restrain undesired angular movement of the stem 145 or until the dial pointer arm 25a is manipulated. The actual circuit for actuating the component parts that revolve the endless tray conveying means which sequentially bring into view the various individual cards of each group of cards, is completed via the wire 158 to arm 155 engaging metal shaft 150, thence through metal disc 149 to contact 147 of arm 156, then through wire 159 to motor 64, wire 160 to upper conducting strip 161 and movable resilient conducting strip 162 of the switch 132, and then to the source of supply 157, thus completing the circuit. The movable conducting strip 162, is engaged and operated by a cam 128a on shaft 128 (Fig. 13), the said cam 128a also withdrawing from strip 162 at a later time in the operating cycle, and thereby permitting the said strip 162 to break the circuit through motor 64 while completing a circuit to motor 137 via the lower conducting strip 163. The circuit of motor 137, as hereinafter described, is completed by a coin previously inserted in the coin slot and at a time when the customer, after finally deciding to purchase a preselected card, has pushed the coin-advancing button 28 in order to permit the device to deliver the card.

In further accordance with the invention, and assuming that the class group of cards desired has been brought before the viewing window 24, if the first card of this group is not to the purchaser's liking, he may now inspect other cards of that same class group by pressing the individual card selector button 26, which completes a momentary parallel circuit across the source of supply 157 (Fig. 14), via wire 158, auxiliary wire 158a, push button 26, wire 159, motor 64, wire 160, switch conducting strip 161, movable switch contact member 162 and thence to source of supply 157.

This momentary energization or parallel circuit will suffice to actuate the motor 64 long enough for the latter to turn the shaft 150 and the two attached discs 149, 151 in order to permit disc 151 to rotate relatively to the wiping contact member 154 and withdraw from the adjacent insulating segment 152 and be engaged with a metallic portion of the disc 151. This partial revolution of the shaft 150 and disc 151 will continue until the next adjacent insulating segment is engaged with a consequent breaking of the circuit. It will be also understood that disc 149 has been synchronously rotated with disc 151, but since the contact finger 147 has been carried around by the prong 148a of the insulating segment 148, in this last described cycle for individual card selection, no flow of current will occur through disc 149. This cycle may be repeated until a card of the preselected group comes to view which meets the customer's requirements.

With a view to obtaining a replica of the selected card, as seen through the window 24 of the casing 22, and as presented by one of the carrying but now motionless trays 36, a coin may be inserted in the slot 27 to be conveyed by the attached coin chute 27a into a tubular or oblong member 165 having a trap-door 166, swingingly supported in the normal horizontal position shown by a spring hinge 167. The coin, it is to be understood, after its insertion, is deposited on the trap-door 166 where it may remain until the customer has fully made up his mind as to the purchase of a card, or to having his coin returned in the event of a non-sale. When desired, the trap-door 166, with a view to the return of the previously inserted coin, may be swung downwardly by an attached cord or wire 168 in turn secured to a lug 169 on the inner end of the stem 170 of the coin return knob 29. This movement of the trap-door will permit the coin, previously supported thereon, to drop into the coin return hopper 30, as hereinafter described more fully. The stem 170 is encircled by a spring 171 confined between the lug 169 and a sleeve 172 arranged in the front wall of the cabinet 22. The stem 170 also has fastened thereon a stop collar 173 which retains the said stem in the normal position shown to which it is biased by the spring 171 (Fig. 11).

As further shown in Fig. 11, the shank or stem 174 of the coin plunger 28 is provided with a pusher block or shoe 175 at its inner end, and is protruded through a partition 176 within the tubular member 165. A compression spring 177 encircling the plunger stem 174 of the coin plunger is confined between the partition 176 and a collar 178 fixed to the plunger stem, the spring normally serving to maintain the plunger assembly in the position illustrated and the shoe in abutment with the partition 176 prior to manual actuation of the said assembly. By thrusting the push button 28 inwardly, any coin on the trap-door will be conveyed to and between the upper end of a non-metallic coin delivery member 180, protruding through an opening 181 in the member 165, and a roller 182, affixed on an arm 183, operatively associated with a circuit-making and breaking switch 184, arranged on the member 165 and adapted to complete a circuit through motor 137 which actuates the vacuum or suction applying means, hereinbefore mentioned. The coin delivery arm or member 180 is rockingly mounted on a pin 185 fastened to a strap 186 supported between upwardly extended panels 187, 187a and maintained in the normal vertical position shown in Fig. 11 by a pair of springs 188, 189 also secured to and between the same partitions. The member 180 is provided at its top portion with a pair of diagonally arranged coin-deflector vanes 190, 191 which as hereinafter described more fully, serve to direct a coin resting on the top of the metallic arm, either to the coin return chute 30, as in the case of a non-purchase; or to the cash box or hopper 192, in the event of a sale. A coin resting on the trap-door 166 when the latter is swung downwardly, will fall on the vane 190 and thence drop into the coin return hopper 30. This procedure occurs when the purchaser has changed his mind before thrusting in the coin-advancing button 28.

Simultaneously with the actuation of the switch 184, a coin-blocking solenoid 193 is energized (Fig. 14) as hereinafter described more fully. The solenoid 193 is arranged in a housing 194 suitably secured to an adjacent portion of the cabinet and the coin chute 27, and has its armature 195 available to protrude across and block the coin chute 27, when its circuit is completed, in order to prevent deposit of another coin while the originally inserted coin is still resting between the rock arm 180 and the switch arm roller 182.

The completion of the electric circuit through motor 137 by the engagement of the coin between the upper end of the coin-delivery rock arm 180 and the switch roller 181, as best shown in Fig. 14, initiates the operation of the motor 137 whose shaft is coupled to the gear reduction assembly 135 in turn coupled to the switch 132 whose shaft 128 bears the cams 127 and 128a. By inspection of Figs. 10 and 13, and as hereinbefore described, it will be seen that the now rotating shaft 128 which turns in a counterclockwise direction, will function to operate the card-ejecting or delivering mechanism that includes the vacuum cup grippers 86 and associated bellows assembly 88, and also the cycle timing and coin delivering mechanism. It is to be understood that both of the cams 127 and 128a on the shaft 128 make one complete revolution for each cycle. The turning of the switch cam 128a in the counterclockwise direction hereinbefore mentioned, will initially break the circuit to the motor 64 as the movable arm 162 is permitted to swing away from conducting strip 161, thus preventing further operation of the card display mechanism during the functioning of the card delivery mechanism. Approximately at the same time as the breaking of the circuit to motor 64, the now released resilient arm 162 will engage with the lower conducting strip 163 and complete a circuit through the suction applying and cycle-timing motor 137. The closing of the circuit to the motor 137, as last described, by the arm 162 and lower conducting strip 163, will be maintained for the rest of the delivery cycle even after the removal of the coin from its position between the arm 180 and roller 182, since the newly established circuit is in parallel or shunt with that initiated by the coin when first thrust into position to operate switch 184.

During the first quarter or approximately 90 degrees of the revolution of the cam 128a, a card will be engaged by one of the gripper cups 86 in the uppermost bin 83 of the delivery drum 78, this action taking place as the cam 127 is still disengaged from the cam roller 125 on the rockingly mounted nozzle pipe 121, the nozzle 124 having communicated suction to the bellows assembly 88 of the said uppermost bin. The further functioning of the card gripper 86 has been in part indicated above, the bellows member 93 progressively collapsing as the air is being continuously evacuated therefrom. This collapsing movement, as best indicated in Figs. 7 and 8, will convey a card adhering to the vacuum cup or card gripper 86 in the direction of the arrow of Fig. 7 to a point where it protrudes substantially without its bin. It will be observed that each bin 83 is provided with a guard rail 83a which serves to retain the other cards in the bin from disarrangement during the extracting of the card through the opening or slot 84a at the end of the said rail, and by its attachment to the card gripper 86. Card stops, as at 85a, are also provided to prevent accidental return of the card as the bellows member 93 resumes the normal position shown in Figs. 7 and 8.

The card, after the vacuum or suction in the card gripper 86 has been nullified by the further action of cam 127 in contacting roller 125 and raising the vacuum nozzle from the adjacent and uppermost socket 101 (Fig. 2), will permit the said card to fall upon the shelf 105 (Fig. 3) and consequently complete momentarily a circuit through switch 108, thereby also momentarily closing a circuit through an electromagnet or solenoid 196 having its armature connected by a link 196a to the bottom of the rock arm 180, and located between the panels 187, 187a. The energization of the said solenoid is effective to pull the lower end of the rocking arm 180 through the intermediary of the link 196a. This pull swings the latter in a counterclockwise direction and permits the coin to fall upon the inclined deflector vane 191 and be deflected thereby into the cash hopper 192. It will be understood that the card at approximately this time of the cycle will have slid off the shelf 105 of the switch 108, and into the card receptacle or hopper 31 where it may be obtained by the customer.

Although the sale and delivery of the card at this stage has been effected, the completion of the coin delivery and timing cycle is not fully completed. The apex of cam 128a at this stage has rotated about 330 degrees of its full revolution and has reached another switch indicated generally at 197 and including the resilient and movable conducting arm 198 that after engagement by cam 128a, is thrust into contact with arm 199, thereby completing the circuit through another electromagnet or solenoid 200 connected by a link 200a to rock arm 180 and effective to rock the latter in a clockwise direction. Since the coin has already been deposited in the cash hopper 192, this movement of the arm 180 does not effect a cash return in this instance. The links 196a and 200a, it is to be understood, provide sufficient lost motion to permit their adjacent attached electromagnets 196 and 200 respectively, to function properly.

Further rotation of the cam 128a and during the last quarter of its full revolution will reengage it with movable arm 162 thereby lifting and withdrawing the latter from the conducting strip 163 consequently breaking the circuit through motor 137 while restoring the parts to the position shown in Fig. 14 and with the coin delivery arm in the neutral or normally vertical position shown in Fig. 11. The coin-blocking solenoid 193 is also deenergized with the return of the coin delivery arm to neutral position.

If the card bin 83 immediately engaged is empty, or the card ejecting mechanism temporarily out of order, or if the cards jam or if there is any other reason which prevents actual delivery of the card, the switch 108 remains open during the whole cam cycle and consequently the cash-deliverying solenoid 196 is not energized. The coin delivery arm also remains in neutral or vertical position, instead of permitting the coin to be deflected into the cash hopper 192. However, in the present contingency, the tip of cam 128a will engage and move, in its rotation, the arm 198 into contact with arm 199 to close thereby a circuit through the coin return solenoid 200 and pull the arm 180 to rock it in a clockwise direction. This last-mentioned rocking movement will permit the coin still on top of the arm 180 to strike the deflector vane 190 and fall into the coin return chute 30.

The operation of the embodiment of the invention disclosed in Figures 1 to 14 inclusive, may be briefly outlined as follows:

The prospective purchaser first avails of the dial 25 to swing the pointer arm 25a to the appropriate angular position indicated by the cooperating circular indicia to bring into effective range a desired group or class of cards. Thus, the arm 25a is moved to the segment indicating birthday cards, sympathy cards, greeting cards or the like. This movement is transmitted to the shaft 145 to rotate the arm 146 and bring the finger 147 out of engagement with the insulated segment 148 and into contact with the periphery of the metallic disk 149. The extent to which this finger is moved depends on the particular group or class of cards.

The electric circuit to the motor 64 is now energized, and this motor will operate both the display apparatus 34 and the vending apparatus 35 to bring the first card of the particular group into position beneath the window 24 of the cabinet where it may be viewed by the prospective purchaser. The motor 64 is connected to the shaft 40 of the display apparatus by the chain 61. This shaft 40 is in turn drivably connected to the shaft 69 by the chain 68. The gear reduction unit 70 is drivably connected to the shaft 69. Thus, as the motor is driven, the gear rejection unit 70 is operated to rotate the shaft 150 until the insulated segment 148 again comes beneath the finger 147. This breaks the circuit to the motor 64 and the latter is deenergized.

If the prospective purchaser is not satisfied with the first card of the particular group which is brought to his attention, he presses the pushbutton 26. This momentarily completes a parallel circuit to the motor 64 and energizes the latter just sufficiently to bring the next card of the group into position where it is inspected. Thus, the push-button 26 may be repeatedly actuated until a satisfactory card is brought into position beneath the window 24. As the display apparatus is operated in this manner, the vending drum is also rotated because it is driven from the shaft 40 by the chain 72. Thus, the bin 83 having a supply of cards corresponding to that which has been brought into position at the window 24, is brought into position in which the flared mouth 101 of the pipe 100 of that particular bin is beneath the nozzle 124.

The operator now inserts a coin through the slot 27. The coin travels downwardly through the tube 27a into the tubular member 165 into a position in which it has not yet engaged the roller 182. In this position it rests on the trap door 166. If, at this time, the prospective purchaser should change his mind either as to the particular card selected, or as to making any purchase at all, he may have the coin returned to him by simply exerting a pull on the coin return knob 29. This motion is transmitted through the line 168 to rock the trap door 166 and cause the coin to fall thereoff onto the baffle 190 which diverts the coin into the coin return box 30, from whence it may be retrieved by the purchaser.

On the other hand, should the purchaser be desirous of completing the sale, he presses inwardly on the coin pusher knob 28. This causes the shoe 175 to engage the coin and move the latter between the upper rounded end of the lever 180 and the roller 82. This imparts an upward movement to the arm 183 to actuate the switch 184 to complete the circuit to the motor 137. At the same time the solenoid 193 is energized to move the plunger 195 into position restricting the slot 27 so that no coin can be inserted therethrough until that particular transaction is completed.

The cash delivery solenoid 196 is also energized to withdraw the plunger 196a from holding engagement with the lower end of the lever 180 and permit the springs 188 and 189 to rock the lever and deliver the coin to the cash box 192. However, this action does not take place unless the switch 108 is closed, which action is accomplished by a card falling onto the shelf 105 with the weight or the card actuating the push button 107 of the switch 108. Of course, if the particular bin is empty, no card will fall onto the shelf 105 and the switch 108 will not be actuated. In this event the solenoid 196 is not energized, but instead the coin return solenoid 200 is energized to rock the lever A in the other direction and deliver the coin to the coin return box 30.

When the circuit to the motor 137 is completed by the switch 182 the shaft 128 is actuated to rotate both the cams 127 and 128a. The cam 127 engages the cam roller 125 on the air conduit 121. Due to the shape of the cam, the spring 121a will rock the conduit 121 and bring the nozzle 124 into engagement with the flared mouth 101 of the pipe 100 of that particular bin. This engagement opens the valve in the nozzle to render effective the vacuum condition in the tank 114 to exhaust air from the bellows 83 and thus cause a card in the particular bin to be picked up by the member 86 and moved over to the upper end of the delivery chute 31.

As the shaft 128 continues to rotate, the cam 128a is effective on the contact strip 162 to break the circuit to the motor 137 at the proper time. Continued rotation of the shaft causes the cam 127 to again lift the nozzle 124 from the flared mouth 101 and interrupt the reduction of pressure in the bellows. The card is then released from the member 86 to fall onto the shelf 105 in the delivery chute 31.

In this condition the nozzle 124 is not connected to any flared mouth 101. The motor 137 is deenergized, and of course, the circuit of the motor 64 is broken. The apparatus is therefore in condition to have the cycle of operation repeated.

In the modified form of the invention shown in Figs. 15 to 17 inclusive, a cabinet, indicated generally at 210 is provided with card display mechanism and card delivery mechanism (not shown) of the same general character as that described and illustrated in the first form of the invention. It is also to be understood that in large measure the same type of driving and operating mechanism therefor is provided. In the present form of the invention, with a view to providing approximately twice the number of cards shown in the first form, two card supply drums, 211, 212 having supply bins, bellows and suction gripper mechanism substantially as shown in Fig. 3 of the other form of the invention, are provided. Each of the two drums 211, 212 has conical socket members 211a, 212a respectively, of the same type as hereinbefore described. The creation of a suction or vacuum is similarly effected through a pair of rockingly mounted nozzle assemblies indicated generally at 213, 214, which are moved into and out of operative engagement with the conical sockets 211a, 212a by cam means 215, 215a respectively, operated in a manner previously described with respect to the first form of the invention. The drums 211, 212 are arranged in spaced relation and secured to shaft 216 supported in bearing brackets 217, 218 mounted on the floor of the cabinet 210. The drum 212 may be slidably mounted on the shaft 216 as by the screw 216a with a view to convenience in refilling the bins of both drums. The shaft 216 is driven as in the first form of the invention and through the intermediary of a chain 219 operatively coupled to a driving motor 220 (Fig. 17).

The features which distinguish the present form of the invention over the form hereinbefore described, will be best understood by inspection of the circuit diagram depicted in Fig. 17 and the fragmentary perspective view (Fig. 16) of the circuit completing means that are controlled and made effective by means similar to those best shown in Figs. 1, 3, 11 and 13 and which include the group dial selector 25 and the individual card selector button 26.

In the present form of the invention, the card display actuating means, are approximately similar to those described and illustrated in the first form of the invention, and wherein the card-bearing trays are similarly advanced in substantially step-by-step progression for convenience of viewing. The said card-displaying means are electrically controlled by means which include a corresponding card group dial selector mechanism (Fig. 16), having three metallic discs 221, 222 and 223 respectively. Discs 221 and 222 are identical with those shown in Fig. 12 of the first form of the invention. A third disc 223 is composed of two equal metal halves 223a, 223b insulatingly separated by an insulating strip 224. These two halves are respectively engaged by diametrically opposed conducting arm 225, 226. As illustrated in Fig. 17, the metal half 223a is engaged by a third conducting arm 227. When the dial selector arm depicted diagrammatically in this instance and designated by the numeral 228, is engaged with the periphery of metallic disc 221 after withdrawal from the insulating stop segment 229 therein, a circuit will be completed from the electric supply 230 via wire 231, wire 232, conducting arm 233, metal shaft 234, metal disc 221, arm 228, wire 235, motor 220, wire 236, conducting strip 237 of switch 238, movable switch arm 239, and wires 240, 241 to the source of supply 230, and thus actuating the motor 220 which, it is to be understood, has its shaft 220a operatively coupled to the shaft 234 on which the three discs 221, 222 and 223 are mounted.

The procedure for viewing the different individual cards of the preselected group of cards, is the same as in the first form of the invention. In the present instance, the individual card selector push button 228a will be thrust inwardly thereby temporarily providing a parallel circuit for the source of supply 230 in the manner described in the first form of the invention. In the present embodiment this will include the metal disc 222 having the circumferential insulating segments 222a which will now function to revolve the endless card display conveyor means sufficiently to bring into view another card tray with its attached card, as hereinbefore indicated.

When it is desired to purchase a card after the selection of a card through the viewing window, the insertion of a coin in the coin slot as above described and its subsequent forwarding by the coin-advance button, will close the circuit of a switch indicated generally at 242 which is of the same type as switch 184. In the instant form, the closing of this circuit will actuate one of the two motors 243, 244 in accordance with the position of the third conducting strip or arm 227 which, as actually illustrated, is engaged with the adjacent metallic half 223a of disc 223. This will complete a circuit from the source of supply 230, via wire 231, motor 243, wire 245, metal half 223a, conducting arm 227, wire 246, wire 247, switch 242, and wires 248, 241 to supply source.

Another motor 249 will be similarly energized via the wires 250, 251 which are shunted across wires 231 and 246. A coin-blocking solenoid 252 similar to solenoid 193 is connected to wire 231 by a wire 253 and to the coin-operated switch 242; and functions to prevent entry of a coin into the machine while a previously inserted coin is still operative to actuate the delivery mechanism. The motor 243, it is to be understood, is effective for rotating the shaft to which cam 215 is secured, while motor 244 rotates the shaft on which cam 215a is fixed. It will be further understood that the independent actuation of the two vacuum or suction-applying means, shown in Fig. 15, permits a card to be withdrawn from either drum 211 or 212, as dictated by the interconnected series of gears or sprockets and their electric controls.

The circuit (Fig. 17) of the modified form in other respects is substantially similar to that shown in Fig. 14 of the first form of the invention and includes two other solenoids 254, 255 which are energized from the source of supply 230 through the intermediary of the card actuated switch 256 and a cam actuated switch 257 operated by a cam 258 on means secured to the shaft of motor 249. The operation of coin return solenoid 254, and cash delivery solenoid 255 is identical with that described with respect to solenoids 200 and 196 of the other form of the invention, and this is also true of the switch 257 which functions in the same manner as switch 197.

The means for independently creating a vacuum are also the same as in the first form, and include a motor 259 connected, as by wire 260, 261 and the automatic switch 262 to the source of supply 230.

In both forms of the invention, it is to be understood that the cards on the trays and in the bins will be accompanied by an envelope, this combination of card and envelope being considered as a card ensemble although for brevity, the term card alone has been employed throughout the foregoing description.

In viewing the cards through the window 24, it will be observed that, as best shown in Figs. 2 and 3, the trays 36 on which each card assembly is secured, are advanced in a step-by-step counterclockwise direction and towards the said window. Each tray, as it approaches the window 24, changes its motion from a horizontal or rectilinear movement to an angular or arcuate and turning movement, in order to present its attached card for convenient viewing in a plane normal to the eye, and while the conveyor has temporarily ceased revolving. The actual turning of the trays 36 while being conveyed through the intermediary of the chains 46, 47 and connected pairs of sprockets 37, 38, is effected by the coaction of the rollers 52, 53 with the guide straps or rails 54, 55, as will be understood by inspection and comparison of Figs. 2, 3 and 5.

It is to be understood that the invention may be embodied in other specific forms without departing from the spirit or essential atttributes thereof, and we therefore desire the present embodiments to be considered in all respects as illustrative and not restrictive, reference being had to the appended claims rather than to the foregoing description to indicate the scope of the invention.

What we claim is:

1. In vending apparatus intended for use with display mechanism for displaying cards to be sold by said vending apparatus, a rotatably mounted drum having a plurality of bins, each adapted to contain a supply of a particular type of card, a bellows operatively associated with each bin and carrying a vacuum cup normally engaging a card of said supply, an exhaust conduit connected to each bellows and having a mouth, a vacuum tank, a conduit communicating with said vacuum tank, means for operatively connecting said last mentioned conduit to a mouth of one of said exhaust conduits, and coin controlled mechanism for operating said connecting means.

2. In vending apparatus intended for use with display mechanism for displaying cards to be sold by said vending apparatus, a rotatably mounted drum having a plurality of bins, each adapted to contain a supply of a particular type of card, a bellows operatively associated with each bin and carrying a vacuum cup normally engaging a card of said supply, an exhaust conduit connected to each bellows and having a mouth, a vacuum tank, a pipe rockably mounted and having a nozzle at one end adapted to engage a mouth of one of said exhaust pipes to establish communication therewith, a conduit including a flexible section connecting the other end of said pipe to said vacuum tank, and coin-controlled mechanism for causing rocking movement of said pipe to bring said nozzle into engagement with one of said mouths.

3. In vending apparatus intended for use with display mechanism for displaying cards to be sold by said vending apparatus, a rotatably mounted drum having a plurality of bins, each adapted to contain a supply of a particular type of card, a bellows operatively associated with each bin and carrying a vacuum cup normally engaging a card of said supply, an exhaust conduit connected to each bellows and having a mouth, a vacuum tank, a rockably mounted pipe having a nozzle at one end adapted to engage within the mouth of one of said exhaust conduits, an automatically operable valve within said nozzle, said valve being normally closed and adapted to automatically open upon engagement of said nozzle with said mouth, a conduit having a flexible section connecting the other end of said pipe to said vacuum tank, means for rocking said pipe, and coin-controlled mechanism for causing operation of said means.

4. In vending apparatus intended for use with card display mechanism, a rotatably mounted drum having a plurality of bins, each adapted to contain a supply of a particular type of card, an electric motor for rotating said bin and for operating said display mechanism, manually operable means for energizing said motor, a bellows operatively associated with each bin and carrying a vacuum cup normally engaging a card of the supply in that bin, an exhaust conduit for each bellows communicating therewith, each of said exhaust conduits having a flared mouth, a vacuum tank, means for establishing communication between said vacuum tank and one of said flared mouths, and coin controlled mechanism for causing operation of said means.

5. In vending apparatus intended for use with card display mechanism, a rotatably mounted drum having a plurality of bins, each adapted to contain a supply of a particular type of card, an electric motor for rotating said bin and for operating said display mechanism, manually operable means for energizing said motor, a bellows operatively associated with each bin and carrying a vacuum cup normally engaging a card of the supply in that bin, an exhaust conduit for each bellows communicating therewith, each of said exhaust conduits having a flared mouth, a vacuum tank, a rockably mounted pipe having a nozzle at one end adapted to engage one of said mouths, a conduit having a flexible section connecting the other end of said pipe to said vacuum tank, spring means associated with said pipe normally urging said nozzle in a direction towards said mouths, a cam normally opposing such motion of said pipe but shaped to permit said spring to force said nozzle into engagement with one of said mouths, a shaft on which said cam is mounted, a second motor operatively connected to said shaft, and coin-controlled mechanism for energizing said second motor.

6. In vending apparatus intended for use with card display mechanism, a rotatable drum providing a plurality of bins each adapted to receive a supply of cards of a particular type, a delivery chute, electrically operated means for picking up a card from one of said bins and dropping it onto said chute, a coin receiving tube adapted to receive a coin from a prospective purchaser, a control switch associated with said tube and adapted to be operated by a coin therein to actuate said means, said tube being formed with an opening beneath said switch, mechanism associated with said opening for delivering a coin from a position in engagement with said switch to either a cash box or a return position, and a switch associated with said chute and adapted to be operated by a card therein to determine the operation of said mechanism.

7. In vending apparatus intended for use with card display mechanism, a rotatably mounted drum providing a plurality of bins, each adapted to contain a supply of cards, a motor for rotating said drum and for operating said display mechanism, manually operable means for energizing said motor to rotate said drum over a comparatively large angular distance, push button actuated means in electric circuit with said motor for momentarily energizing said motor to move said drum through a comparatively small angular distance, a delivery chute, means for picking up a card from the supply of one of said bins and dropping it onto the upper end of said chute, and coin controlled mechanism for operating said last mentioned means.

8. In vending apparatus intended for use with card display mechanism, a rotatably mounted drum providing a plurality of bins, each adapted to contain a supply of cards, a motor for rotating said drum and for operating said display mechanism, manually operable means for energizing said motor to rotate said drum over a comparatively large angular distance, push button actuated means in electric circuit with said motor for momentarily energizing said motor to move said drum through a comparatively small angular distance, a delivery chute, means for picking up a card from the supply of one of said bins and dropping it onto the upper end of said chute, a second motor for causing operation of said means, a control switch for said second motor, a coin receiving tube, and a pusher for moving a coin in said tube into operative engagement with said switch.

9. In vending apparatus intended for use with card display mechanism, a rotatably mounted drum providing a plurality of bins, each adapted to contain a supply of cards, a motor for rotating said drum and for operating said display mechanism, manually operable means for energizing said motor to rotate said drum over a comparatively large angular distance, push button actuated means in electric circuit with said motor for momentarily energizing said motor to move said drum through a comparatively small angular distance, a delivery chute means for picking up a card from the supply of one of said bins and dropping it onto the upper end of said chute, a second motor for causing operation of said means, a control switch for said second motor, a coin receiving tube, a pusher for moving a coin in said tube into operative engagement with said switch, and manually operable means for diverting a coin to a return position from said tube prior to engagement with said switch.

10. In vending apparatus intended for use with card display mechanism, a rotatably mounted drum providing a plurality of bins, each adapted to contain a supply of cards, a motor for rotating said drum and for operating said display mechanism, manually operable means for energizing said motor to rotate said drum over a comparatively large angular distance, push button actuated means in electric circuit with said motor for momentarily energizing said motor to move said drum through a comparatively small angular distance, a delivery chute, a bellows for each bin having a vacuum cup normally engaging a card of the supply in that bin, an exhaust pipe for each bellows communicating therewith and having a flared mouth, a rockably mounted pipe having a nozzle adapted to engage any of said flared mouths, a vacuum tank, a conduit including a flexible section connecting said vacuum tank to said pipe, a second motor for actuating said cam means, and coin controlled mechanism for causing operation of said second motor.

PHILIP CHALFIN.
BENJAMIN CHALFIN.

References Cited in the file of this patent

UNITED STATES PATENTS

| Number | Name | Date |
|---|---|---|
| 748,795 | Scheble | Jan. 5, 1904 |
| 852,222 | Conover | Apr. 30, 1907 |
| 966,083 | Cochran et al. | Aug. 2, 1910 |
| 1,007,049 | Barta | Oct. 31, 1911 |
| 1,416,159 | Barr | May 16, 1922 |
| 1,433,444 | Ziegler | Oct. 24, 1922 |
| 1,775,730 | McNicol | Sept. 16, 1930 |
| 2,050,161 | Crabb | Aug. 4, 1936 |
| 2,099,682 | Draeger | Nov. 23, 1937 |
| 2,117,045 | Warner | May 10, 1938 |
| 2,172,519 | Reeder | Sept. 12, 1939 |
| 2,189,641 | Slezak | Feb. 6, 1940 |
| 2,321,402 | Margulis | June 8, 1943 |
| 2,354,896 | Weiler | Aug. 1, 1944 |

FOREIGN PATENTS

| Number | Country | Date |
|---|---|---|
| 449,541 | Great Britain | June 29, 1936 |
| 498,178 | Great Britain | Jan. 4, 1939 |
| 498,368 | Great Britain | Jan. 6, 1939 |
| 580,500 | Great Britain | Apr. 19, 1945 |